United States Patent [19]

Caughlin

[11] 3,854,170

[45] Dec. 17, 1974

[54] COTTON LINT CLEANER

[75] Inventor: James Daniel Caughlin, La Jolla, Calif.

[73] Assignee: Ginners Incorporated, Monroe, La.

[22] Filed: Aug. 17, 1973

[21] Appl. No.: 389,384

[52] U.S. Cl. .................................................. 19/202
[51] Int. Cl. ............................................. D01b 3/00
[58] Field of Search ............ 19/202, 205, 105, 97.5, 19/64.5, 95

[56] References Cited
UNITED STATES PATENTS

| | | | |
|---|---|---|---|
| 2,948,022 | 8/1960 | Day | 19/202 X |
| 3,470,588 | 10/1969 | Just | 19/202 |
| 3,685,099 | 8/1972 | Jenkins, Jr. | 19/95 |

FOREIGN PATENTS OR APPLICATIONS

| | | | |
|---|---|---|---|
| 567,499 | 2/1945 | Great Britain | 19/105 |

*Primary Examiner*—Dorsey Newton
*Attorney, Agent, or Firm*—Brown & Martin

[57] ABSTRACT

In a cotton lint cleaning machine the lint is formed into a thin bat and fed on to a rotating toothed cylinder or saw, which rotates at high speed and causes foreign matter to be thrown off by centrifugal force. The improvement is a feed bar extension plate which is precisely adjustable to fit closely against the periphery of the saw cylinder to seat the cotton bat firmly into the saw teeth, allowing the saw to be rotated at much higher speed without loss of lint. The saw confronting face of the extension plate is made from non-sparking soft material which will not cause a fire even if contacted by the saw teeth.

7 Claims, 4 Drawing Figures

COTTON LINT CLEANER

BACKGROUND OF THE INVENTION

A cotton lint cleaning machine is usually coupled to the output of one or more cotton gins to process and clean the lint of foreign matter, such as trash, motes, shale, cracked seed and the like. A typical machine is manufactured by the Moss-Gordin Lint Cleaning Co. and is disclosed in detail in U.S. Pat. No. Re. 24,624. In this machine, cotton lint is collected on a condenser drum and formed into a continuous cotton bat, which is reduced in thickness between driven feed rolls. The bat is fed around a fixed feed bar and applied to the surface of a rotating toothed cylinder or saw, which turns at sufficient speed to throw off trash by centrifugal force. The trash is deflected by stripper bars into a dump chute and the cleaned cotton is removed from the saw by a brush and delivered in lint form.

The rotational speed of the saw, and thus the trash throwing action is limited by the ability of the saw to hold the cotton bat. Inefficient retention of the cotton can result in considerable loss of lint along with the trash. The cotton is seated into the saw teeth by the feed bar, which is set at minimum clearance from the teeth. However, some clearance is necessary due to tolerances in the saw diameter and distortion of the machine under load. Contact of the saw with the feed bar must be avoided to prevent sparks, which could cause a fire in the cotton. Due to the necessary clearance, the thickness of the cotton bat extends slightly beyond the saw teeth and portions may be thrown from the surface.

SUMMARY OF THE INVENTION

The improvement described herein comprises an extension plate mounted on the fixed feed bar to provide secure seating of a thin cotton bat on the saw cylinder, and allow the saw to be rotated at much higher speed than usual, resulting in more efficient trash ejection and an increased production rate of cleaned cotton. The extension plate is secured to the feed bar and extends in the direction of rotation of the saw cylinder, the plate being arcuate in cross section to match the circumference of the saw. Adjustment means is provided along the entire length of the extension plate, both at its attachment to the feed bar and at the trailing edge, the plate having sufficient resiliency to allow precise adjustment to minimum clearance from the saw. The saw confronting pressure face of the plate is composed of a non-sparking material which is softer than and will not cause undue wear of the saw teeth. This prevents the danger of fire due to inadvertent contact of the saw teeth with the pressure face, and due to shifting or slight misalignment of the components, and makes the very small clearance practical. The cotton fiber is thus securely seated on the saw cylinder, essentially within the depth of the saw teeth, and resists any loss of lint due to centrifugal force. While such loss may be a small percentage of the total cotton processed, the overall loss in a large production facility becomes siginificant. The secure seating makes it possible to use a much higher than usual speed differential between the feed and the saw cylinder surface, resulting in an improved combing action. A soft doffer blade is also used to ensure removal of the cotton from the saw cylinder.

The primary object of this invention, therefore, is to provide a useful improvement in a cotton lint cleaner.

Another object of this invention is to provide means for attaching cotton securely to a high speed centrifugal trash ejection cylinder in a lint cleaner.

Another object of this invention is to provide such attaching means which is precisely adjustable to fit the machine.

A further object of this invention is to provide an improvement which is readily adaptable to existing cotton lint cleaning machines.

Other objects and many advantages of this invention will become more apparent upon a reading of the following detailed description and an examination of the drawing, wherein like reference numerals designate like parts throughout and in which.

DESCRIPTION OF THE PREFERRED EMBODIMENT

Figures 1, 2:
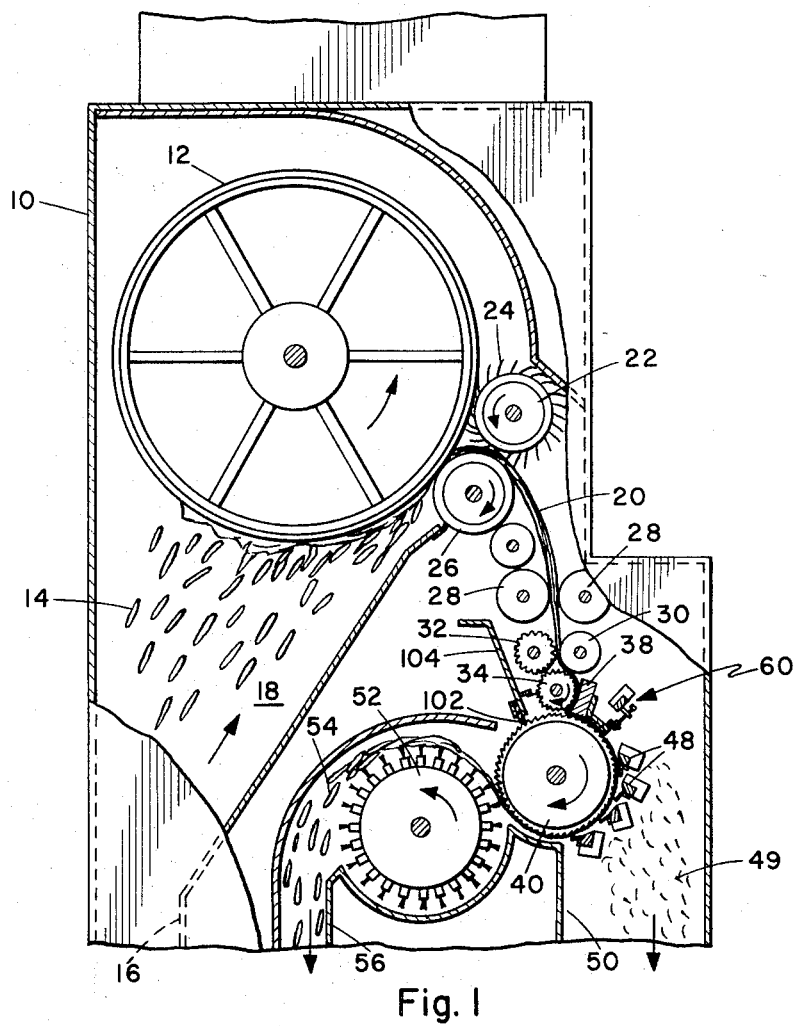
FIG. 1 is a side elevation view of the feed portion of a typical cotton lint cleaning machine, with a portion of the side structure cut away.
FIG. 2 is an enlarged perspective view, in section, of the feed bar, extension plate and adjustment means.

As illustrated in FIG. 1, the machine includes a housing 10, in the upper portion of which is a rotatable condenser cylinder 12. Cotton lint 14 is drawn or blown, from a gin or other source, through an inlet duct 16 into a chamber 18 below the condenser cylinder, the lint collecting on the cylinder in the form of a continuous bat 20 as the cylinder rotates. In U.S. Pat. No. Re. 24,624, the condenser cylinder is described as a wire screen or mesh structure through which air is drawn to pull the cotton lint to the surface.

The cotton bat 20 is removed from the cylinder 12 by a doffing roll 22 having flexible blades 24, and turned over a smooth discharge roll 26 to pass downwardly between a pair of rolls 28, which reduce the thickness of the bat. The bat then passes through a feed roller assembly, including a smooth roll 30 and a fluted roll 32, which further compress the bat between them. From there the bat passes around a splined feed roll 34, against the curved front face 36 of the fixed feed bar 38. Below the feed bar is a rotatable saw cylinder 40 having rows of circumferential saw teeth 24, the flat lower face 44 of feed bar 38 being spaced just above the teeth. The bat is turned around the smoothly rounded lower leading edge 46 of the feed bar 38 and applied to the saw teeth 42, the saw cylinder rotating in a clockwise direction as illustrating. This provides a combing action to the cotton.

Behind the feed bar in the direction of saw cylinder rotation are stripper bars 48, spaced circumferentially and extending the full length of the saw cylinder. The stripper bars deflect the trash 49 thrown from the cotton into a dump chute 50 for disposal. The cleaned cotton fiber continues around the saw cylinder and is removed by a rotatable brush 52, the cleaned lint 54 being ejected into an outlet duct 56.

Figure 3:
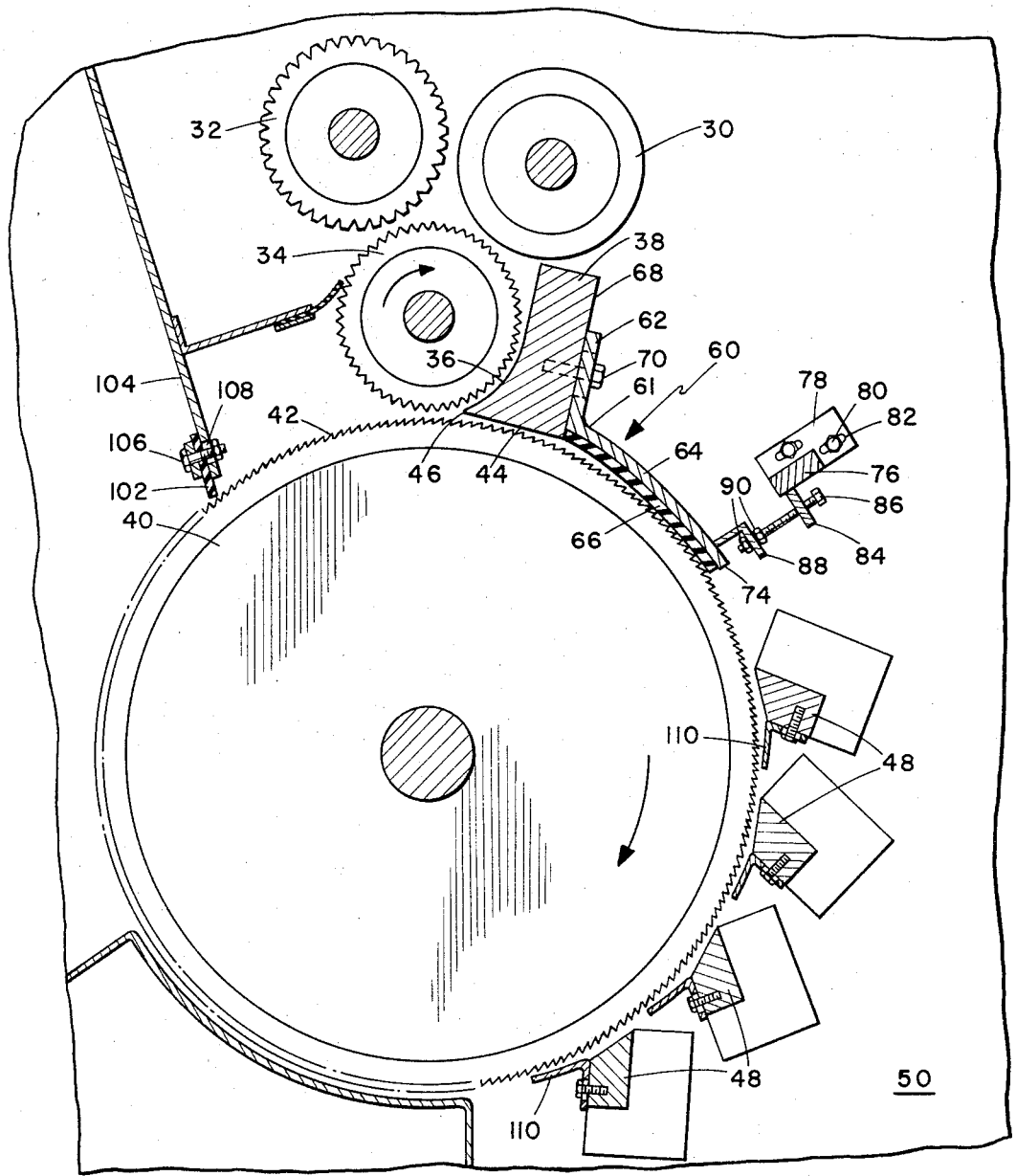
FIG. 3 is an enlargement of a portion of FIG. 1.

Thus far the structure is essentially that of the above mentioned U.S. Patent, which also includes the associated ducting and controls. The improvement is an attachment to the feed bar 38, as illustrated in FIGS. 2 and 3.

Extension assembly 60 includes an angle member 61 extending the full length of the feed bar and having a mounting flange 62, with an extension plate 64 extending from the lower edge thereof. Extension plate 64 is arcuate in cross section to match closely the diameter of saw cylinder 40. On the lower or concave side of the extension plate is a replaceable facing 66 of rubber, plastic, or even a soft metal such as copper. The primary requisite of the facing is the ability to withstand contact or even slight penetration by the saw teeth 42, without sparking or disintegrating.

Mounting flange 62 is secured to the rear face 68 of feed bar 38 by longitudinally spaced bolts 70 through slotted holes 72 in the flange, which allow adjustment of the extension plate substantially radially to the saw cylinder. Spaced outwardly from and parallel to the trailing edge 74 of extension plate 64 is a tie bar 76, which is fixed between end plates 78 secured to housing 10. The end plates are held by bolts 80 through slotted holes 82, which allow for adjustment in the initial assembly. Projecting rearwardly from tie bar 76 is a flange 84, through which are threaded longitudinally spaced adjustment bolts 86. Fixed to and spaced outwardly from the trailing portion of extension plate 64 is an attachment flange 88. Adjustment bolts 86 pass through the attachment flange 88 and are secured by lock nuts 90 on opposite sides of the flange.

Figure 4:
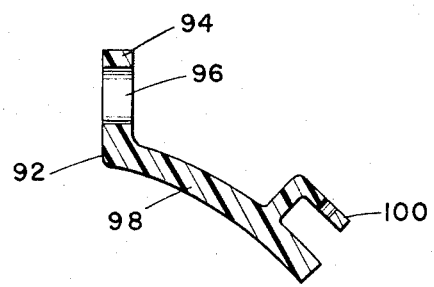
FIG. 4 is a cross-section of an alternative one piece extension plate.

As an alternative to the extension plate with a replaceable facing, the extension assembly 92 illustrated in FIG. 4 may be used. The extension assembly comprises an angle member comparable to angle member 61 and having a mounting flange 94, with slotted holes 96, an extension plate 98 and an attachment flange 100. The configuration is similar to that of angle member 61, but is readily adaptable to extrusion from a suitable material such as plastic. A tough plastic such as Lexan, or other polycarbonate type material is particularly suitable. The plastic member would be low in cost and could be replaced in its entirety when the saw confronting face became worn.

With either configuration the extension plate can be adjusted precisely along its entire length to be substantially in contact with the saw teeth, or at least with a minimum clearance not practical with the feed bar itself. The cotton is thus packed down into the saw teeth, with little if any protrusion after the fiber moves out from below the extension plate. Trash from the very thin layer of cotton is thrown off, but the cotton itself is securely held. It has been found that the saw cylinder can be rotated at more than twice its normal speed without any significant loss of lint. This more than doubles the useful output of the machine, while reducing expense due to lint loss. In the lint cleaner, the peripheral speed of the saw cylinder is normally greater than the speed at which the cotton is fed from feed roll 34. This results in a combing action of the cotton as it is pulled over leading edge 46. The secure packing of the cotton on the saw cylinder by the facing 66 allows the saw cylinder to be operated at higher speed, with a greater than normal speed differential from the feed. The combing action is thus greatly increased and separation of trash is improved.

To ensure removal of the cotton from the saw cylinder, a doffer blade 102 is attached to the existing wind board 104 of the machine just ahead of the feed station.

Doffer blade 102 is of soft non-sparking material similar to facing 66, and is made adjustable by bolts 106 through slotted holes 108 in the wind board 104. The clearance between the doffer blade and the saw teeth can thus be minimized to form an air trap, so that this arrangement can be used with the brush 52, as illustrated, or with a vacuum type lint removal system as sometimes used.

In addition to the fiber retaining action of the extension assembly 60, additional means is provided to prevent loss of lint from the high speed saw cylinder during the trash ejection stage. Each of the existing stripper bars 48 is provided with an extension plate 110 extending therefrom in the direction of saw cylinder rotation. The extension plates 110 are radially adjustable, in a manner similar to angle member 61, enabling a minimum clearance to be set from the saw teeth, so that the fiber is retained on the cylinder. The extension plates also minimize gaps between the stripper bars, allowing trash to be ejected but not the lint.

While the extension assembly is primarily for use in a lint cleaner, it is also adaptable to some types of carding machines. The precise adjustment over the full length facilitates setting of minimum clearance to hold fiber on a carding drum.

Having described my invention, I now claim:

1. In a cotton lint cleaning machine having means for forming lint into a continuous bat of cotton, a rotatable toothed saw cylinder on which the cotton bat is held and spun to eject trash therefrom, and feed means including a feed bar adjacent the cylinder for applying the bat to the teeth of the cylinder, the improvement comprising:
   an extension plate secured to the feed bar and extending therefrom in the direction of rotation of the cylinder and across substantially the entire length thereof, said extension plate conforming arcuately to the periphery of the cylinder and having a trailing edge portion remote from the feed bar;
   the cylinder confronting face of said extension plate being of a non-sparking material;
   and means for adjusting at least the trailing edge portion of said extension plate substantially radially relative to the cylinder.

2. The structure of claim 1, wherein said extension plate has a mounting flange with means for substantially radial adjustable attachment to the feed bar and forming with the extension plate, an elongated angle member.

3. The structure of claim 2, wherein said angle member is a unitary element of the non-sparking material.

4. The structure of claim 1, wherein said means for adjusting includes multiple screw adjustment means spaced along the trailing edge portion of said extension plate remote from the feed bar.

5. The structure of claim 1, wherein said adjustment means includes a tie bar fixed in the machine, spaced from and substantially parallel to the trailing edge portion of said extension plate, and a plurality of longitudinally spaced screw adjustment means connecting said trailing edge portion to said tie bar.

6. The structure of claim 5, and including end plates on said tie bar by which the tie bar is adjustably secured to the machine.

7. The structure of claim 1, and including a doffer blade radially adjustably mounted in the machine and extending along the entire length of the saw cylinder, said doffer blade being of soft non-sparking material and being held closely adjacent to the surface of the saw cylinder ahead of the feed bar in relation to the direction of rotation of the saw cylinder.

* * * * *